(12) United States Patent
Cameron

(10) Patent No.: US 7,189,024 B2
(45) Date of Patent: Mar. 13, 2007

(54) TARP CONNECTOR

(76) Inventor: Robert W Cameron, 814 Lakeway Dr. #395, Bellingham, WA (US) 98226

( * ) Notice: Subject to any disclaimer, the term of this patent is extended or adjusted under 35 U.S.C. 154(b) by 40 days.

(21) Appl. No.: 10/665,911

(22) Filed: Sep. 20, 2003

(65) Prior Publication Data

US 2005/0063773 A1    Mar. 24, 2005

(51) Int. Cl.
*E04H 15/62* (2006.01)
(52) U.S. Cl. .................. 403/306; 24/105; 135/118; 5/417; 5/496
(58) Field of Classification Search ........ 403/342–344, 403/306; 24/105, 458; 135/117–119; 5/417, 5/496, 498
See application file for complete search history.

(56) References Cited

U.S. PATENT DOCUMENTS

| | | | | |
|---|---|---|---|---|
| 1,347,642 A | * | 7/1920 | McNatt ......................... 5/502 |
| 1,825,029 A | * | 9/1931 | Trub ............................ 24/105 |
| 2,174,521 A | * | 10/1939 | Lancaster .................... 24/105 |
| 3,986,519 A | * | 10/1976 | Gillis .......................... 135/125 |
| 4,267,615 A | * | 5/1981 | Nealy .......................... 441/75 |
| 5,137,483 A | * | 8/1992 | Nealy .......................... 24/105 |
| 5,490,309 A | * | 2/1996 | Velasquez et al. ........... 24/90.1 |

* cited by examiner

*Primary Examiner*—Daniel P. Stodola
*Assistant Examiner*—Michael P. Ferguson
(74) *Attorney, Agent, or Firm*—Todd N. Hathaway

(57) ABSTRACT

A connector assembly that enables a rope or other load to be attached to a tarp or other sheet material. The assembly includes male and female connector members having broad, flat base surfaces for engaging the material of the tarp from opposite sides. The male connector member has a sharply pointed screw portion for penetrating through the material of the tarp, and the female connector member has a threaded socket for receiving the screw portion of the male connector member. At least one of the connector members includes a projecting flange portion having an opening or hook for attachment of the rope or other load. The flange portions are flattened for being gripped between the thumb and forefinger when tightening/loosening the assembly. The grip faces of the connector members include raised protuberances that prevent accidental loosening during use.

2 Claims, 5 Drawing Sheets

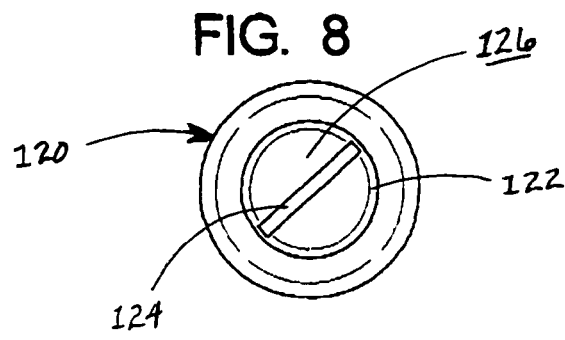
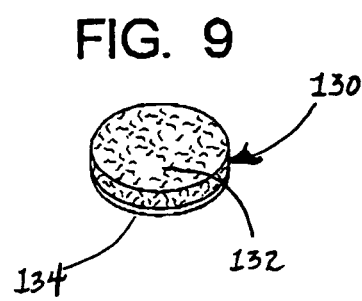
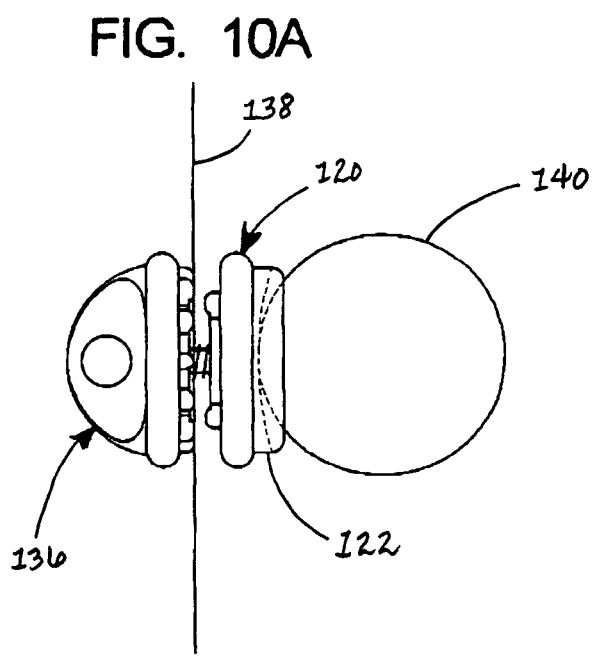
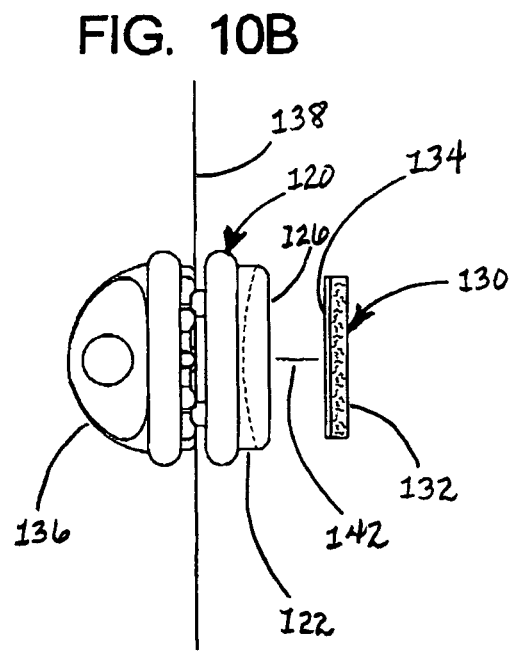

TARP CONNECTOR

BACKGROUND a. Field of the Invention

The present invention relates generally to accessories for use with tarps and similar sheet materials, and, more particularly, to a connector that mounts to the fabric or other material of a tarp so as to allow attachment of a load thereto.

b. Related Art

For ease of description and understanding the present invention is described herein primarily with reference to "tarps". It will be understood, however, that as used in this description and the appended claims, the term "tarp" is not limited to tarpaulins of traditional construction and includes all thin, flexible sheets that are used to provide cover and for similar purposes, whether they are formed of woven or non-woven material. Also included are articles and structures that incorporate or are constructed of tarp materials, such as tents and similar enclosures.

As is well known, tarps provide useful coverings for a vast range of purposes. Just a few examples include tents and other temporary shelters, coverings for protecting lumber or other material from exposure to the weather, coverings over trucks or other vehicles during transportation, temporary enclosures for portions of buildings when under construction or repair, and so on.

Although the potential uses for tarps are virtually limitless, it can be seen that the great majority involve providing shelter or protection from the environment and therefore require that the tarp be secured in some manner. For this reason, many tarps are provided with grommets along their edges for attachment of ropes or shock ("bungee") cords. However, these provide only a limited number of attachment points, and at locations that are rarely optimal for any particular situation. The grommets also tend to tear out of the edges and corners of the material, rendering the tarp largely useless unless a substitute can be made. Conversely, when working with tarps cut from Visqueen™ or other sheet material there may be no grommets to begin with, and some form of attachment point must therefore be added to have any means for securing the tarp.

Still further, it is frequently desirable to have one or more attachment points that are spaced inwardly from the edges where grommets are traditionally provided. For example, it may be desirable to have a series of attachments arranged across the tarp so that the tarp can be suspended from a rope or other support with the two sides sloping downwardly in the manner of a roof. As another example, it may be desirable to provide an attachment for hanging a load from some portion of the tarp, for example, for hanging a lantern in a tent.

A number of prior devices have been developed in an effort to address at least some of these issues. In general, these have taken the form of various replacement grommets, as well as a number of clips which were intended to grip the fabric of the tarp in one fashion or another. For example, certain clips have been developed which include a ring into which the fabric is pressed and secured by a plug on the opposite side of the tarp. Other devices employ various forms of jaws or clamps to grip the fabric of other material.

Although some such prior devices have enjoyed varying degrees of success, they have also exhibited a number of deficiencies. Firstly, all of the devices that rely on gripping the material in jaws and like structures are subject to slipping off when subjected to a load. Many are limited by their design to exerting force in a direction generally parallel to the plane of the tarp, e.g., for gripping/pulling at the edge of the tarp, and are consequently unsuitable for use in central areas of the tarp. Some, notably those using a ring-and-plug design, are also cumbersome and difficult to use. Moreover, the gripping, pinching, and holding actions generated by these devices tend to both damage and unevenly load the fabric of the tarps, causing frequent rips and tears.

Accordingly, there exists a need for an apparatus that is capable of providing an attachment Point at any location on a tarp, whether along the edges or inwardly towards the middle of the tarp. Furthermore, there is a need for such an apparatus that is capable for supporting a load that is exerted in a direction normal to or otherwise out of the plane of the material of the tarp. Still further, there is a need for such an apparatus that will tend to not slip off of the tarp when subjected to a load. Still further, there is a need for such an apparatus that will not cause tears or rips to develop in the material of the tarp. Still further, there is a need for such an apparatus that is inexpensive to manufacture, and that is easy and quick to use and install.

SUMMARY OF THE INVENTION

The present invention has solved the problems cited above. Broadly, this is a connector assembly for use with a tarp, the connector assembly comprising: male and female connector members, each of the connector members comprising: a base portion having a broad, generally flat bearing face for engaging the material of the tarp, at least one of the connector members further comprising a handle portion extending from the base portion opposite the bearing face for being gripped for rotation by the fingers of the hand and having an opening for the attachment of a load thereto; said male connector member further comprising a threaded screw portion extending normal to the bearing face thereof, the screw portion having a tapered, sharply pointed tip for piercing material of a tarp; and said female connector member further comprising a threaded socket portion extending normal to the bearing face thereof for receiving the screw portion of the male connector member in threaded engagement therewith.

Each of the bearing faces on the connector members may comprise a plurality of raised protuberances for frictionally engaging material of the tarp so as to prevent accidental loosening of the connector members. The protuberances may have substantially rounded contours so as to avoid damaging of the material of the tarp that is engaged thereby. The raised protuberances may comprise a plurality of elongate, substantially oval protuberances arranged radially about the screw and socket portions of the connector members. The bearing faces may further comprise a raised, substantially flat-surfaced clamping ring formed around the screw and socket portions, respectively, for clamping the tarp around the opening formed by the screw portion so as to prevent tears from propagating therefrom.

Each of the bearing faces of the connector members may be substantially circular so as to evenly distribute loads into the material of the tarp that is engaged thereby. Each of the base portions may further comprise a radiused rim extending about a perimeter of the circular bearing face for compressively engaging material of the tarp so as to avoid the damage thereto. The radiused rim may comprise a rounded lip having a smoothly contoured radius that extends away from the plane of the flat bearing face to an arc of about 90° or greater.

The handle portions of the connector members may comprise a flange portion extending generally normal to the base portion for being gripped between a thumb and forefinger. The flange portion may comprise a generally semicircular flange having first and second sides that flare concavely towards the base portion of the connector member.

The at least one opening for attachment of the load may comprise a bore formed in at least one of the flange portions, intersecting a common axis of the screw and socket portions and extending generally transverse thereto. The at least one opening may also comprise a hook portion mounted on at least one of the flange portions The screw portion of the male connector member may comprise a tapered thread portion for gradually spreading material of the tarp so as to minimize damage to the material, as the material is penetrated by the screw portion. The screw portion may further comprise a straight-sided thread portion for engaging a corresponding straight-sided thread portion in the socket portion of the female connector member. The screw portion of the male connector member and the socket portion of the female connector member may be configured to form an interference fit when tightened together.

The male and female connector members may each be formed unitarily, as of injected molded plastic material.

These and other features and advantages of the present invention will be apparent from a reading of the following detailed description with reference to the accompanying drawings.

BRIEF DESCRIPTION OF THE DRAWINGS

FIG. 8 is a top, plan view of a connector member in accordance with another embodiment of the invention, in which one of the connector members is flat-topped and therefore lacks a loop or other attachment portion;

FIG. 9 is a perspective view of a protective pad having an adhesive backing for attachment to the flat-topped connector member of FIG. 8; and FIGS. 10A–10B are elevational, sequential views showing the manner in which a connector assembly using the flat-topped connector member of FIG. 8 is mounted to a tarp and the protective pad of FIG. 9 is then affixed thereto.

DETAILED DESCRIPTION

Figure 1:
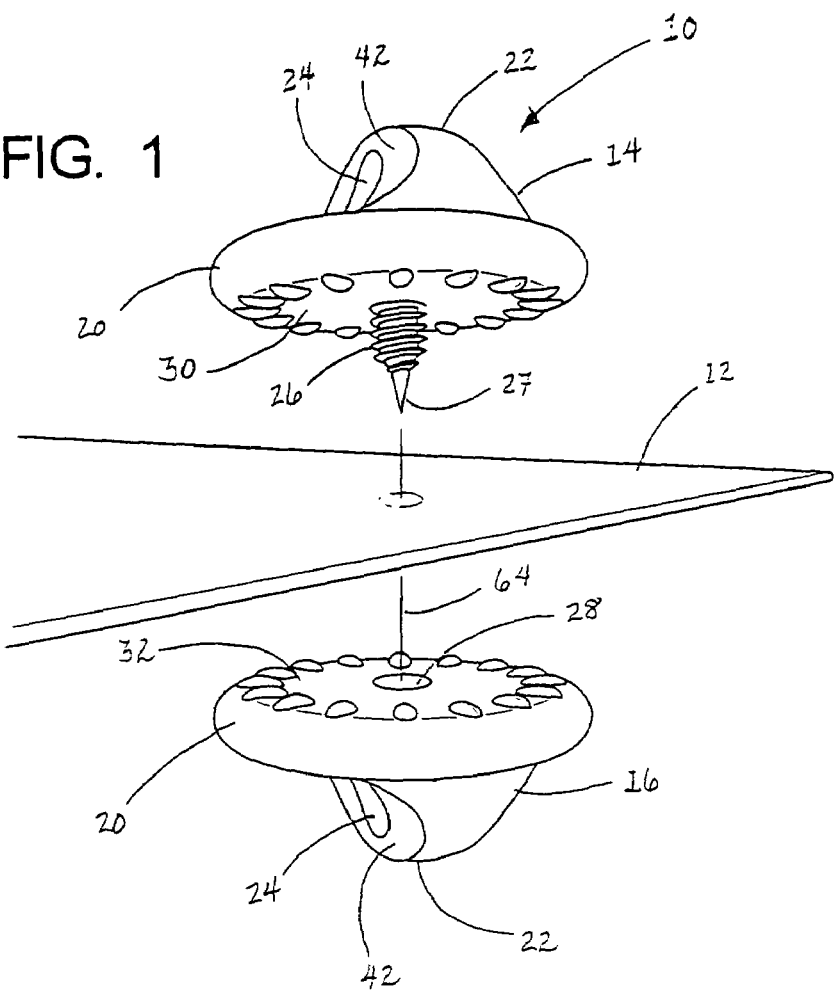
FIG. 1 is a perspective, environmental view of a tarp connector assembly in accordance with the present invention, showing the manner in which the male connector member penetrates the material of the tarp and engages the female connector member on the opposite side thereof.

FIG. 1 shows a connector assembly 10 in accordance with a preferred embodiment of the present invention, and the manner in which this is attached to the panel of an exemplary tarp 12. As can be seen, the connector assembly includes male and female connector members 14, 16 that are positioned on opposite sides of the tarp.

The male and female connector members are generally similar in overall shape, in that each includes a generally flat, circular base portion 20 and an outwardly extending attachment portion 22 having an opening 24 for an attachment to a hook, rope, cord or the like. However, as can be seen in FIG. 1 and also FIG. 2, the male connector member 14 is provided with a central screw portion 26 that extends normal to the base surface and is provided with a tapered, sharply pointed tip 27 for piercing the material of tarp 12. The female connector member 16, in turn, includes a central, internally threaded socket portion 28 for receiving the screw portion 26 in threaded engagement. The threads and taper of the screw and socket portions may be configured to establish an interference fit that helps to prevent the members from loosening when screwed together.

Figure 3A:
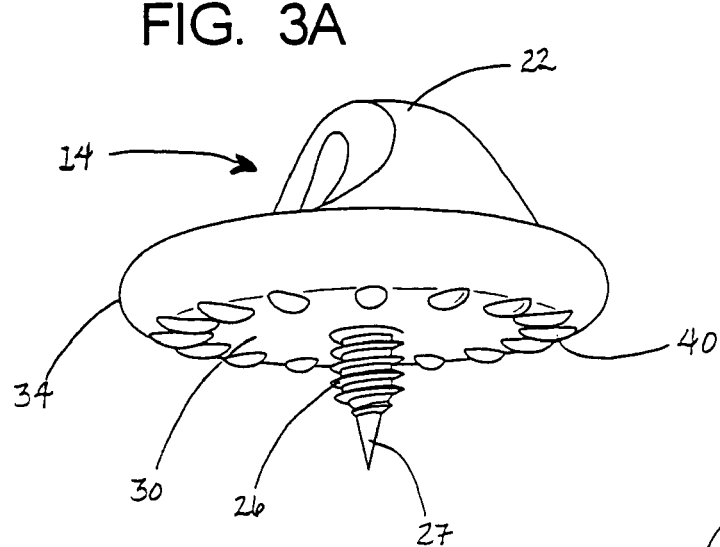
FIGS. 3A and 3B are, respectively, bottom perspective and top perspective views of the male connector member of the connector assembly of FIGS. 1–2, showing the various features thereof in greater detail.
Figure 3B:
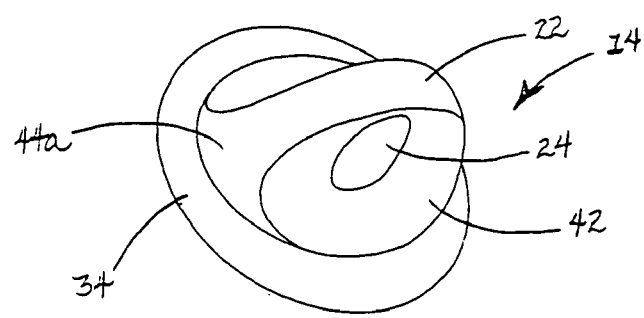

As can be seen in FIG. 1 and also FIG. 3A, the screw portion 26 and threaded socket portion 28 are centered in broad, generally flat, circular faces 30, 32 of the male and female connector members 14, 16. These provide broad bearing surfaces for distributing loads into the fabric or other material of the tarp, so as to avoid rips and tear-outs. Furthermore, because the bearing surfaces are circular, loads are distributed into the material more or less evenly regardless of the direction in which they are exerted, (e.g., regardless of the direction in which rope is pulling on the connector). It will be understood, however that mating surfaces having different geometries may be used in some embodiments.

Figure 2:
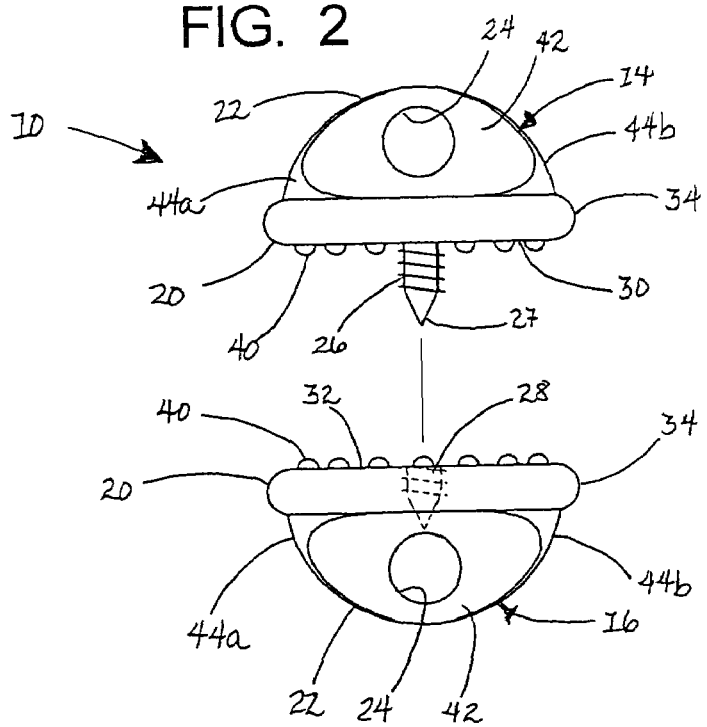
FIG. 2 is an elevational view of the tarp connector assembly of FIG. 1, showing the manner in which the members mate in greater detail.

As can also be seen, particularly with reference to FIG. 2, each of the faces 30, 32 is provided with a radiused border 34 about its perimeter. The radiused perimeter extends away from the plane of the face, and preferably bends back upon itself so as to complete and arc of about 90° or more. A 0.125-inch circular radius is generally suitable, although it will be understood that radiuses having other sizes or configurations (e.g., oval) may be used.

In the preferred embodiment, the radiused borders 34 thus form lips or shoulders all about the grip faces 30, 32. Since the radiused surfaces bend gradually away from the material of the tarp, they avoid concentration of stresses at the edges of the connectors that might otherwise cause the material to tear or rupture. Furthermore, when the connector is pulled to one side or the other, so that the grip faces 30, 32 do not lie parallel to the main plane of the tarp, the rounded radius obviates any possibility of sharp edges coming into contact with the tarp in a manner that might damage the fibers or other material. In the preferred embodiment, where the radiused edge extends in an arc of more than 90° (approximately 180° in the illustrated embodiment), the connector can be pulled over to a right angle to the tarp and beyond (as may happen when a tarp is flapping in the wind or the rope attached to the connector is pulled to one side) without any sharp edges coming into contact with the fabric or other material.

The grip faces 30, 32 also include a plurality of raised protuberances that engage the material of the tarp when the connector face is tightened against it. This establishes a frictional engagement that prevents accidental loosening of the connector halves during use. With further tightening the opposing protuberances ride over one another to form an interfitting engagement that essentially locks the two connector members together.

The protuberances may have any suitable shape, such as circular dots, ovals, teeth, and so on; however, they are preferably rounded in profile so as to avoid damaging the material of the tarp or concentrating stresses. In the preferred embodiment which is illustrated, the protuberances 40 comprise a plurality of elongate, somewhat oval bumps that are arranged radially around the contact faces 30, 32 proximate the perimeters thereof. This configuration provides significant advantages, in that the long axes of the protuberances are arranged generally perpendicular to the direction of rotational motion when unscrewing the members and therefore provide increased resistance to accidental loosening. Moreover, the configuration of the protuberances as discrete bumps, as opposed to elongate ribs or mere surface texturing, helps to ensure that these will cooperate with the protuberances on the opposing connector member to form an interfitting engagement with the material of the tarp (with the material being pressed back and forth between the protuberances on opposite sides) rather than merely riding on top of it. Furthermore, the elongate oval form of the protuberances 30 avoids any sharp or angular edges that might damage the fabric or other material of the tarp.

As noted above, the attachment portions 22 of the two connector members that are shown in FIGS. 1–3B are formed as closed loops with through-openings 24 for attachment of a hook or cord. Each opening 24 is preferably located centrally in its connection portion, with its axis intersecting and extending generally perpendicular to that of the screw and socket portions.

In the illustrated embodiment, the attachment portion 22 is formed as a protruding, somewhat semicircular flange 42. The flange projects from the base portion of the connector member by a distance (e.g., about 1-inch) that is sufficient that it can be grasped between the thumb and forefinger of a person's hand, and has a thickness (e.g., about 3/16-inch) at its outer end that is thin enough to be convenient for this purpose yet thick enough that the material has sufficient strength to withstand the loads that are exerted thereon. The twisting loads are transferred into the base of the attachment member by arched webs 44a, 44b on both sides of the opening 24, helping to ensure that the loads are transferred more or less evenly into the fabric or other material of the tarp. The webs 44a, 44b are flared and widened where they are joined to the base portion of the connector member, which provides the flange portion with a concavely dished contour that is ergonomically advantageous for being held between a thumb and forefinger, as well as sufficient strength to withstand the forces that are exerted during tightening/ loosening without developing excessive flexing or cracking where the flange meets the base portion.

Figure 6:
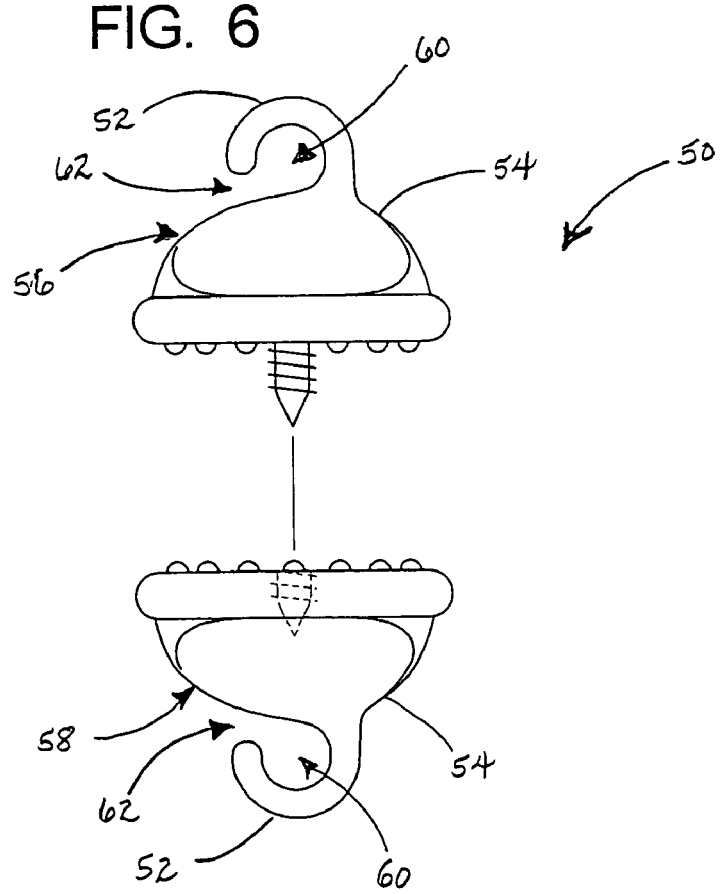
FIG. 6 is an elevational view, similar to FIG. 2, of a tarp connector in accordance with a second embodiment of the present invention, in which the connector members are provided with hooks for attachment of loads, rather than closed loops.

Although the connector portion 22 having the configuration shown in FIGS. 1–3B provides certain advantages that have been described above, in some instances it may be desirable to have a load attachment point in the form of a hook rather than a closed loop. FIG. 6 consequently shows a connector assembly 50 in accordance with another embodiment of the present invention, in which open-sided hook portions 52 extend from the flange portions 54 of the male and female connector members 56, 58. Each of the hook portions defines an opening 60 for receiving a hook or cord therein, the openings being centrally located and being formed around an axis that extends generally perpendicular to that of the screw and socket portions in a manner similar to openings 24 described above. The entrances 62 to the hook openings are sized somewhat smaller than the diameter of the openings 60 themselves so as to reduce the likelihood of a rope or cord accidentally slipping out, the hook portions (as well as the rest of the connector members) preferably being formed of a rigid but resiliently flexible material that allows the hook portion to flex slightly so as to allow passage of a rope or cord through entrances 62 when desired.

The male and female member of the connector assembly may be formed of any suitable material. However, molded plastic, such as molded glass-filled nylon, is generally preferable; among other benefits, molded plastic allows for inexpensive and rapid manufacture using injection molding processes, and the low thermal conductivity characteristic of plastic materials renders the assembly easier to use under cold and wet conditions.

Although not shown in FIG. 6, a closed opening identical or similar to the opening 24 described above may be incorporated in one of the flange portions 54 in some embodiments. In other respects, the male and female connector members 56, 58 are substantially the same as the connector members 14, 16 described above.

To attach the connector assembly to the tarp, the operator simply positions the male and female members on opposite sides of the sheet and presses them together, as indicated by arrow 64 in FIG. 1. As this is done, the sharp point 27 penetrates the material of the tarp and enters the receptacle 28 in the opposite connector member. The male connector member is then rotated clockwise so that the threads enter the fabric of the tarp and feed the shaft of the screw portion 26 therethrough. The female connector member may be counter-rotated simultaneously, until the assembly has been tightened to the desired extent. In the event that the operator is unable to reach both sides of the tarp at the same time, the operator simply installs the male connector member first, pressing the tip into the tarp and screwing it into the material. The threads on the screw portion 26 will retain the male connector in the tarp while the operator walks to the other side and attaches the female connector member; the frictional engagement of the protuberances 30 on the male connector member will help to prevent the latter from unscrewing as the female member is tightened, although it may be necessary to retighten the male connector member after attaching a load to hold the female member stationary.

To detach the assembly, the male and female members are simply unscrewed and pulled away from the tarp. As this is done, the fabric or other material of the tarp will tend to spring back and close the opening that is formed by the screw portion of the male connector member, due to the fact that the sharp point and threads allow the screw portion to penetrate the tarp with comparatively little damage to the material of the tarp.

Figure 4:
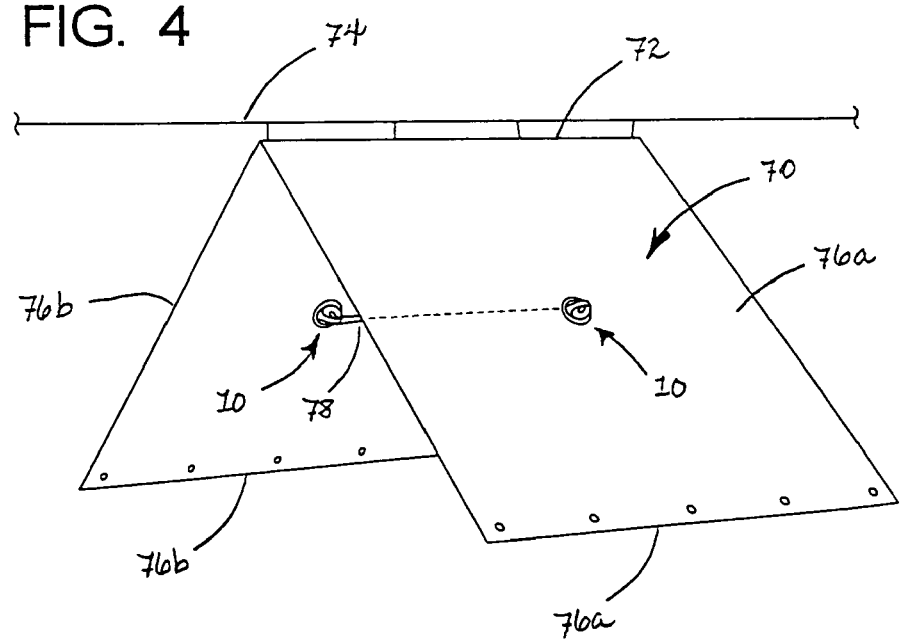
FIG. 4 is a perspective, environmental view of a tarp rigged as a tent to show example uses of the connector assembly of FIGS. 1–3.
Figure 5:
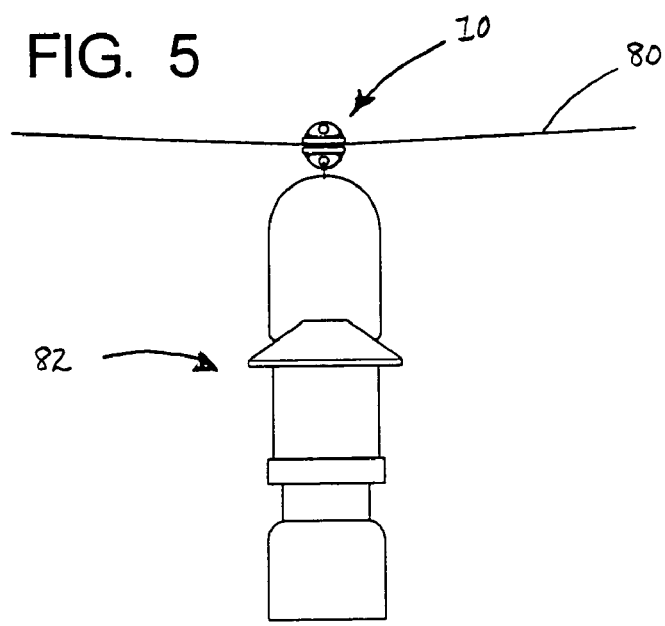
FIG. 5 is a an elevational, environmental view of a tarp having the connector assembly of FIGS. 1–3 attached thereto, showing the manner in which the connector allows loads to be supported from the tarp in a direction perpendicular to the plane thereof.

FIGS. 4 and 5 provide illustrations of just two examples of the manifold uses of the connector assembly of the present invention. FIG. 4 shows an installation in which the tarp 72 is suspended from a rope 74 strung between two trees or other supports, with its lower edges 76a, 76b being spread apart and staked to the ground to form a shelter. In order to prevent the two walls 78a, 78b of the shelter from billowing out excessively in the wind, a pair of the connector assemblies 10 may in installed in the walls opposite one another and interconnected by a rope or other cord 78 that is stretched across the interior of the shelter. The connector assemblies 10 can also be used to form the attachment for the rope along the ridgeline 72 of the shelter.

FIG. 5 shows an example of another installation. In this instance, the connector assembly 10 is installed in a more or less horizontally extending section of tarp 80 (e.g., the roof of the tent or other shelter) in order to support a vertical load, in this case a lantern 82.

It will be understood, of course, that an almost infinite variety of such installations and uses are possible. Yet other examples include attaching Visqueen™ or other sheet material to scaffolding to enclose work areas on buildings, either to shield them from weather or to prevent the escape of paint or dust onto adjacent buildings and vehicles, or installing a plurality of connectors around the perimeter of a tarp and stringing a rope therethrough so as to form a "hem" that can be cinched tight to secure the tarp over an object such as a boat or vehicle.

Figure 7A:
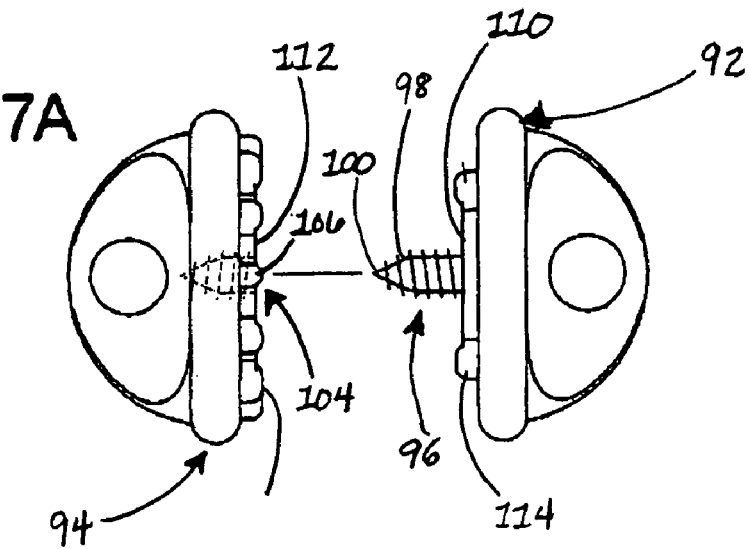
FIG. 7 is a perspective view of a tarp connector assembly in accordance with another embodiment of the present invention, showing the male and female members having flat, annular clamping surfaces formed about the screw and socket portions thereof.
Figure 7B:
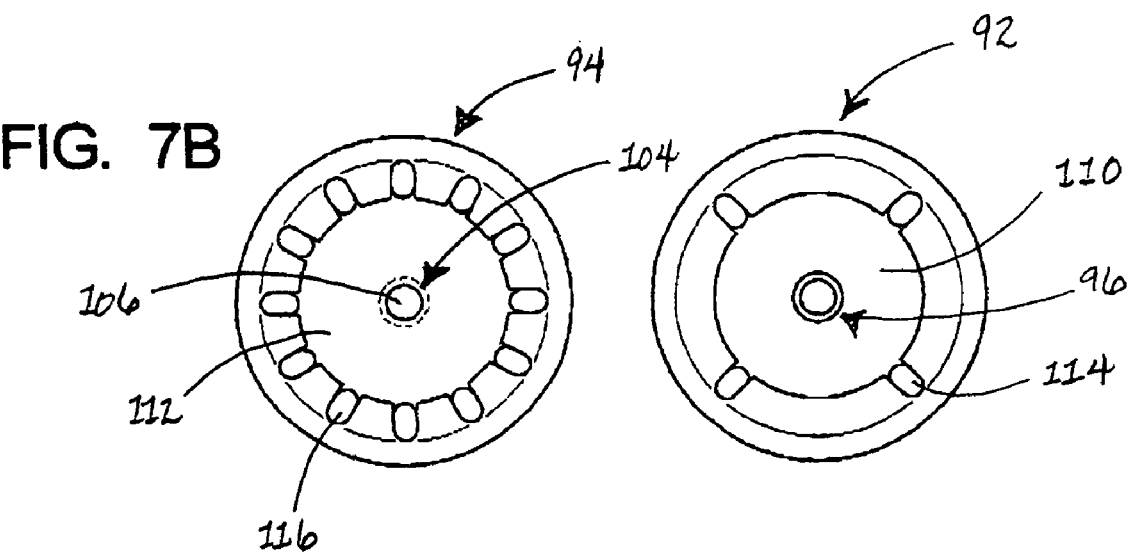

FIG. 7 shows a connector assembly 90 in accordance with another embodiment of the present invention. Similar to the embodiments described above, the assembly includes cooperating male and female connector members 92, 94. These differ from the connector members described above in two principle respects: the configuration of the screw portion of the male connector member and the corresponding socket portion in the female connector member, and the configuration of the mating surfaces that engage the two sides of the tarp.

As can be seen, the screw portion 96 of the male connector member in this embodiment has a two-stage thread. At the tip there is a conically tapered thread 98 terminating in a sharply pointed tip 100. The tapered thread transitions to a straight-sided thread portion 102 that extends over the remainder of the length of the screw portion; the conically tapered thread and/or the transition portion may advantageously have a configuration similar to that of a self-tapping screw. In use, the tapered thread portion initially penetrates the material of the tarp and helps to feed the screw portion through the material as the male connector member is rotated, the gradual taper both easing its operation and gradually threading the material of the tarp so as to minimize damage; in some embodiments the tapered thread may also be progressive, somewhat in the manner of a gimlet, so as to help in the initial piercing and entry through the material. Further rotation of the male connector member then feeds the larger diameter, straight-sided threaded portion 102 through the opening. The socket portion 104 contains a corresponding straight-sided threaded portion 106 that then receives and engages the straight-sided thread portion of the male connector member. The engagement between the straight-sided thread portions provides an increased load-bearing capacity and reduced possibility of pulling out, as compared with a tapered thread, and therefore allow the assembly to be tightened to a greater extent if desired.

As noted above, the embodiment illustrated in FIG. 7 also differs in the form of the mating surfaces that engage the material of the tarp. As can be seen, the male and female connector members 92, 94 both include substantially flat, circular clamping surfaces 110, 112 that extend annularly around the screw and socket portions, respectively. The annular clamping surfaces grip both sides of the material of the tarp around the opening that is formed by the screw portion, so as to prevent tears propagating from the opening when the connector assembly is subjected to a load. The clamping surfaces suitably have a diameter in the range from about 1.0–2.5 cm for most applications, and are preferably substantially smooth and without significant discontinuities or protrusions.

A plurality of protuberances 114, 116 extend radially about the perimeters of the annular contact surfaces. The protuberances function in a manner similar to the corresponding protuberances 40 described above, i.e., they serve a "locking" function so as to prevent accidental loosening of the assembly. Consequently, they likewise have generally rounded contours. However, as can be seen in FIG. 7, in this embodiment the assembly is formed with a significantly smaller number of protuberances on one member than the other (e.g., four protuberances on the male member and twelve on the female member). This provides a satisfactory locking action and allows the same flexibility in the degree of tightening as using a large number (e.g., twelve) protuberances on both members, but achieves a not inconsequential savings in the amount of plastic material and thereby reduces manufacturing costs. Tactile qualities are also improved and damage to the fabric or other material of the tarp is reduced. It will be understood that attachment members having four protuberances on the one and twelve on the other has been found highly satisfactory, but other numbers and combinations may be used in other embodiments.

FIGS. 8–10B illustrate another embodiment of the invention, in which one of the connector members of the assembly is generally flat-topped and lacks an attachment portion, so that a rope or cord is attached to only one side of the assembly when installed. As will be described in greater detail below, this embodiment has particular utility in certain applications where it is unnecessary or undesirable to have a protrusion or connection on the other side of the tarp.

FIG. 8 accordingly shows the top of a female connector member 120 which is generally similar to the connector members described above, except in having a raised, flat-topped generally circular boss 122 in place of a loop or other connector portion. The raised boss provides the connector member with sufficient depth to accommodate the threaded socket, (as described above), and includes a transverse slot 124 that is sized to receive the edge of a coin or the blade of a screwdriver or other tool. It will be understood that in some embodiments the male member may have the flat upper surface that is shown in FIG. 8, rather than the female member, however it is generally more convenient for the male member to be provided with the attachment portion so as to provide a handle portion that aids in forcing the screw portion through the material of the tarp, as will be described below.

Optionally, a soft, resilient pad may be provided for installation on the flat upper surface 126. A principle purpose of the pad is to protect the surface of an underlying object from abrasion or damage, such as the paint or other finish of an automobile, aircraft or boat. Accordingly, FIG. 9 shows a protective pad member 130 formed of a circular plug of carpet-like material 132, having an adhesive backing 134 by which the plug is attached to the surface 126 of attachment member 120. It will be understood that other forms of soft, cushioning material may be used in addition to the carpet material that is shown in FIG. 9, such as a layer of resilient foam rubber material, for example.

In order to install the connector assembly including the flat topped member 120 of FIG. 8, the screw portion of a male connector member 136 is first passed through the material of the tarp 138. The female connector member 120 is then threaded onto the protruding screw portion on the opposite side of the tarp, with a coin 140 being inserted in slot 124 to provide a finger grip to complete the tightening (as noted above, a screwdriver or similar tool may be used in place of the coin). The coin is then removed and, as indicated by arrow 142 in FIG. 10B, the adhesive backing 134 is pressed against the upper surface 126 of the flat-topped connector member in order to secure the protective pad thereto.

It is to be recognized that various alterations, modifications, and/or additions may be introduced into the constructions and arrangements of parts described above without departing from the spirit or ambit of the present invention as defined by the appended claims.

What is claimed is:

1. A connector assembly for use with a tarp, said connector assembly comprising:
   male and female connector members, each said connector member comprising:
      a base portion having a broad, generally flat bearing face for engaging material of a tarp; and
      a flange portion that extends from said base portion opposite and generally normal to said bearing face for being gripped between and rotated by the fingers of a hand, said flange portion having an opening for attachment of a load thereto;
   said male connector member further comprising:
      a threaded screw portion extending normal to said bearing face thereof, said screw portion having a tapered, sharply pointed tip for piercing material of a tarp; and
   said female connector member further comprising:
      a threaded socket portion extending normal to said bearing face thereof for receiving said screw portion of said male connector member in threaded engagement therewith, said socket portion being recessed into said bearing face of said female connector member so that said bearing faces of said male and female connector members are able to meet in substantially face-to-face contact when said connector members are tightened together; wherein said opening for attachment of a load comprises:
      a bore formed through said flange portion around an axis that extends generally perpendicular to an axis of said screw and socket portions.

2. A connector assembly for use with a tarp, said connector assembly comprising:
   male and female connector members, each said connector member comprising:
      a base portion having a broad, generally flat bearing face for engaging material of a tarp; and
      a flange portion that extends from said base portion opposite and generally normal to said bearing face for being gripped between and rotated by the fingers of a hand, said flange portion having an opening for attachment of a load thereto;
   said male connector member further comprising:
      a threaded screw portion extending normal to said bearing face thereof, said screw portion having a tapered, sharply pointed tip for piercing material of a tarp; and
   said female connector member further comprising:
      a threaded socket portion extending normal to said bearing face thereof for receiving said screw portion of said male connector member in threaded engagement therewith, said socket portion being recessed into said bearing face of said female connector member so that said bearing faces of said male and female connector members are able to meet in substantially face-to-face contact when said connector members are tightened together; wherein said opening for attachment of a load comprises:
      a hook portion formed on said flange portion and having a hook opening formed around an axis that extends generally perpendicular to an axis of said screw and socket portions.

* * * * *